United States Patent
Ohnishi et al.

(10) Patent No.: US 7,428,461 B2
(45) Date of Patent: Sep. 23, 2008

(54) WALKER NAVIGATION DEVICE, WALKER NAVIGATION METHOD, AND PROGRAM

(75) Inventors: Keisuke Ohnishi, Tokyo (JP); Takayuki Matsunaga, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 151 days.

(21) Appl. No.: 10/548,309

(22) PCT Filed: Feb. 19, 2004

(86) PCT No.: PCT/JP2004/001881

§ 371 (c)(1),
(2), (4) Date: Sep. 6, 2005

(87) PCT Pub. No.: WO2004/079298

PCT Pub. Date: Sep. 16, 2004

(65) Prior Publication Data

US 2006/0195251 A1  Aug. 31, 2006

(30) Foreign Application Priority Data

Mar. 7, 2003 (JP) .............................. 2003-060865

(51) Int. Cl.
*G01C 21/00* (2006.01)
(52) U.S. Cl. ................... 701/214; 342/357.02
(58) Field of Classification Search .................. 701/207, 701/214; 342/357.01, 357.02
See application file for complete search history.

(56) References Cited

U.S. PATENT DOCUMENTS 6,480,784 B2 * 11/2002 Mizuno ...................... 701/207
6,900,758 B1 * 5/2005 Mann et al. ............. 342/357.02
2002/0169545 A1 * 11/2002 Toyooka ...................... 701/207
2005/0075119 A1 * 4/2005 Sheha et al. .............. 455/456.6
2006/0274818 A1 * 12/2006 Gilmour et al. ............. 375/146

FOREIGN PATENT DOCUMENTS

| JP | 2000-74680 | 3/2000 |
|---|---|---|
| JP | 2000-180191 | 6/2000 |
| JP | 2000-346655 | 12/2000 |
| JP | 2001-264076 | 9/2001 |
| JP | 2001-272450 | 10/2001 |
| JP | 2002-214321 | 7/2002 |

\* cited by examiner

*Primary Examiner*—Mark Hellner
(74) *Attorney, Agent, or Firm*—Westerman, Hattori, Daniels & Adrian, LLP.

(57) ABSTRACT

A pedestrian navigation device (10A) of this invention has a position information reception unit (12), which obtains current position information from a GPS (20); a position information analysis unit (13), which calculates the current position by analyzing received current position information; a MAPDB (Map Data Base) (14), which stores map information; a multi-path control unit (17), which specifies a multi-path control distance to control multi-path interference; a central processing portion (11), which calculates current position display information, based on the current position calculated by the position information analysis unit (13), on map information stored in the MAPDB (14), and on the multi-path control distance specified by the multi-path control unit (17); a display unit (15), which displays current position display information; and an input unit (16), which inputs distance specification value and route search conditions and issues instructions to begin navigation. By this means, a pedestrian navigation device is provided, which enables to accurately navigate the route of a pedestrian by appropriately correcting the multi-path interference.

12 Claims, 4 Drawing Sheets

WALKER NAVIGATION DEVICE, WALKER NAVIGATION METHOD, AND PROGRAM

TECHNICAL FIELD

This invention relates to a pedestrian navigation device, method, and program for navigation of the route of a pedestrian. In particular, this invention relates to a pedestrian navigation device, method, and program capable of accurately navigating a pedestrian by appropriately correcting multi-path interference.

BACKGROUND ART

Conventionally, there are navigation devices, portable telephones and similar which provide navigation of routes for vehicles and persons using position information from the GPS (Global Positioning System).

Upon receiving position information from the GPS, multi-path caused by buildings and other obstacles often prevents from receiving position information correctly, causing a positioning error of about 100 meters.

Regarding to prevent such a problem, Japanese Patent Laid-open No. 2000-180191 discloses a navigation device, which calculates its estimating position using a travel distance and an angular shift amount, calculates the distance between its position and receiving satellite, and detects multi-path by comparing a signal traveling time of the GPS signals and the calculated distance. If multi-path interference is detected, the position is not corrected according to information from the GPS. This allows to prevent an increase of the position correction error caused by multi-path interference.

DISCLOSURE OF THE INVENTION

According to Japanese Patent Laid-open No. 2000-180191, however, the navigation device needs measurements of the travel distance using pulses from a device on a vehicle and measurements of an angular shift amount using a gyro sensor. Hence, such a device was not able to be applied for a navigation device for a pedestrian.

Otherwise, for a pedestrian navigation device, the travel distance can be checked by every measurement using the GPS. When too long walking distance for a pedestrian is measured according to the GPS information, such distance can be processed considering multi-path interference. This method, however, would increase the load on a navigation device, and the response time would be substantially long.

Hence, one object of this invention is to provide a pedestrian navigation device, method, and program capable of accurately navigating the route of a pedestrian by appropriately correcting multi-path interference.

In order to attain this object, the pedestrian navigation device of a first aspect of the invention is a pedestrian navigation device which navigates the route of a pedestrian, having position information reception means for obtaining current position information; position information analysis means for calculating the current position by analyzing current position information received by the position information reception means; map information storage means for storing map information; multi-path control means for specifying a multi-path control distance to control multi-path interference; central processing means for calculating current position display information, based on the current position calculated by the position information analysis means, on map information stored by the map information storage means, and on the multi-path control distance specified by the multi-path control means; display means for displaying current position display information calculated by the central processing means; and input means for inputting distance specification value to specify the multi-path control distance; and characterized in that multi-path control means specifies the multi-path control distance according to the distance specification value input by the input means.

By multi-path control means, (a) if distance specification value is input by the input means, the multi-path control distance is specified according to the distance specification value, but (b) if distance specification value is not input by input means, multi-path control distance is specified, based on the current position calculated by the position information analysis means, and on mesh data of map information stored by the map information storage means.

Also, in order to attain this object, the pedestrian navigation device of a second aspect of the invention is a pedestrian navigation device which navigates the route of a pedestrian, having position information reception means for obtaining current position information; position information analysis means for calculating current position by analyzing current position information received by the position information reception means; map information storage means for storing map information; multi-path control means for specifying a multi-path control distance to control multi-path interference; central processing means for calculating current position display information, based on the current position calculated by the position information analysis means, on map information stored by the map information storage means, and on the multi-path control distance specified by the multi-path control means; and, display means for displaying current position display information calculated by the central processing means; and characterized in that the multi-path control means specifies the multi-path control distance, based on the current position calculated by the position information analysis means, and on mesh data of map information stored by the map information storage means.

Also, in order to attain this object, the pedestrian navigation device of a third aspect of the invention is a pedestrian navigation device which navigates the route of a pedestrian, having position information reception means for obtaining current position information; position information analysis means for calculating current position by analyzing current position information received by the position information reception means; map information storage means for storing map information; multi-path control means for specifying a multi-path control distance to control multi-path interference; multi-path history storage means for storing multi-path history information relating past multi-path control distance and map information; central processing means for calculating current position display information, based on the current position calculated by the position information analysis means, on map information stored by the map information storage means, and on the multi-path control distance specified by the multi-path control means; and, display means for displaying current position display information calculated by the central processing means; and characterized in that the multi-path control means specifies multi-path control distance, based on the current position calculated by the position information analysis means, on map information stored by the map information storage means, and on multi-path history information stored by the multi-path history storage means.

Here, the multi-path control means searches multi-path history information stored by the multi-path history storage means, based on the current position calculated by the position information analysis means, and on map information stored by the map information storage means, and (a) if multi-path history information is stored by the multi-path history storage means, specifies the multi-path control distance based on multi-path history information, but (b) if multi-path history information is not stored by the multi-path history storage means, specifies the multi-path control distance, based on the current position calculated by the position information analysis means, and on mesh data of map information stored by the map information storage means.

Also, in order to attain this object, the pedestrian navigation device of a fourth aspect of the invention is a pedestrian navigation device which navigates the route of a pedestrian, having position information reception means for obtaining current position information; position information analysis means for calculating current position by analyzing current position information received by the position information reception means; map information storage means for storing map information; multi-path control means for specifying a multi-path control distance to control multi-path interference; multi-path history storage means for storing multi-path history information relating past multi-path control distance and map information; central processing means for calculating current position display information, based on the current position calculated by the position information analysis means, on map information stored by the map information storage means, and on the multi-path control distance specified by the multi-path control means; display means for displaying current position display information calculated by the central processing means; and, input means for inputting a distance specification value to specify the multi-path control distance; and characterized in that by the multi-path control means (a) if the distance specification value is input by the input means, the multi-path control distance is specified according to the distance specification value, but (b) if the distance specification value is not input by the input means, the multi-path history information stored by the multi-path history storage means is searched, based on the current position calculated by the position information analysis means, and on map information stored by the map information storage means, and (b-1) if multi-path history information is stored by the multi-path history storage means, the multi-path control distance is specified based on multi-path history information, but (b-2) if multi-path history information is not stored by the multi-path history storage means, the multi-path control distance is specified, based on the current position calculated by the position information analysis means, and on mesh data of map information stored by the map information storage means.

In the above, the position information reception means obtains current position information from the GPS (Global Positioning System).

Also, in order to attain this object, the pedestrian navigation method of a first aspect of the invention is a pedestrian navigation method which navigates the route of a pedestrian, having the steps of (A) obtaining current position information; (B) calculating the current position by analyzing obtained current position information; (C) specifying a multi-path control distance to control multi-path interference; (D) calculating current position display information, based on the calculated current position, on map information prepared beforehand, and on specified multi-path control distance; and (E) displaying calculated current position display information.

Here, in step (C), the multi-path control distance is specified, according to the input distance specification value to specify the multi-path control distance.

Also, in step (C), multi-path control distance is specified, based on the calculated current position and mesh data of map information prepared beforehand.

Also, in step (C), (C-1) if the distance specification value is input, the multi-path control distance is specified according to the distance specification value; but (C-2) if the distance specification value is not input, the multi-path control distance is specified, based on the calculated current position, and on mesh data of map information prepared beforehand.

Also, in order to attain this object, the pedestrian navigation method of a second aspect of the invention is a pedestrian navigation method which navigates the route of a pedestrian, having the steps of (A) obtaining current position information; (B) calculating current position by analyzing obtained current position information; (C) specifying a multi-path control distance to control multi-path interference, and in addition relating the multi-path control distance and map information to store as multi-path history information; (D) calculating current position information, based on the calculated current position, on map information prepared beforehand, and on the specified multi-path control distance; and (E) displaying current position display information.

Here, in step (C), the multi-path control distance is specified, based on the calculated current position, on map information prepared beforehand, and on stored multi-path history information.

Also, in step (C), multi-path history information is searched, based on the calculated current position and on map information prepared beforehand, and (C-1) if the multi-path history information is stored, multi-path control distance is specified based on multi-path history information; but (C-2) if multi-path history information is not stored, the multi-path control distance is specified, based on the calculated current position, and on mesh data of map information prepared beforehand, and in addition map information and the multi-path control distance are related to be stored as multi-path history information.

Also, in step (C), (C-1) if the distance specification value is input, multi-path control distance is specified according to the distance specification value, and in addition map information and the multi-path control distance are related to be stored as multi-path history information; but (C-2) if the distance specification value is not input, multi-path history information is searched, based on the calculated current position, and on map information prepared beforehand; and (C-2-1) if multi-path history information is stored, the multi-path control distance is specified based on multi-path history information; but (C-2-2) if multi-path history information is not stored, the multi-path control distance is specified, based on the calculated current position, and on mesh data of map information prepared beforehand, and in addition map information and the multi-path control distance are related to be stored as multi-path history information.

Here, in step (A), current position information is obtained from the GPS.

In order to attain this object, a program of a first aspect of the invention is a program which allows a portable terminal to navigate the route of a pedestrian, and is characterized in realizing the functions of the above-described pedestrian navigation devices in the portable terminal.

In order to attain this object, a program of a second aspect of the invention is a program which allows a portable terminal to navigate the route of a pedestrian, and is characterized in realizing the functions of the above-described pedestrian navigation method in the portable terminal.

Specifying multi-path control distance allows to appropriately correct multi-path interference, enabling to correctly navigate the route of a pedestrian.

BEST MODE FOR CARRYING OUT THE INVENTION

Figure 1:
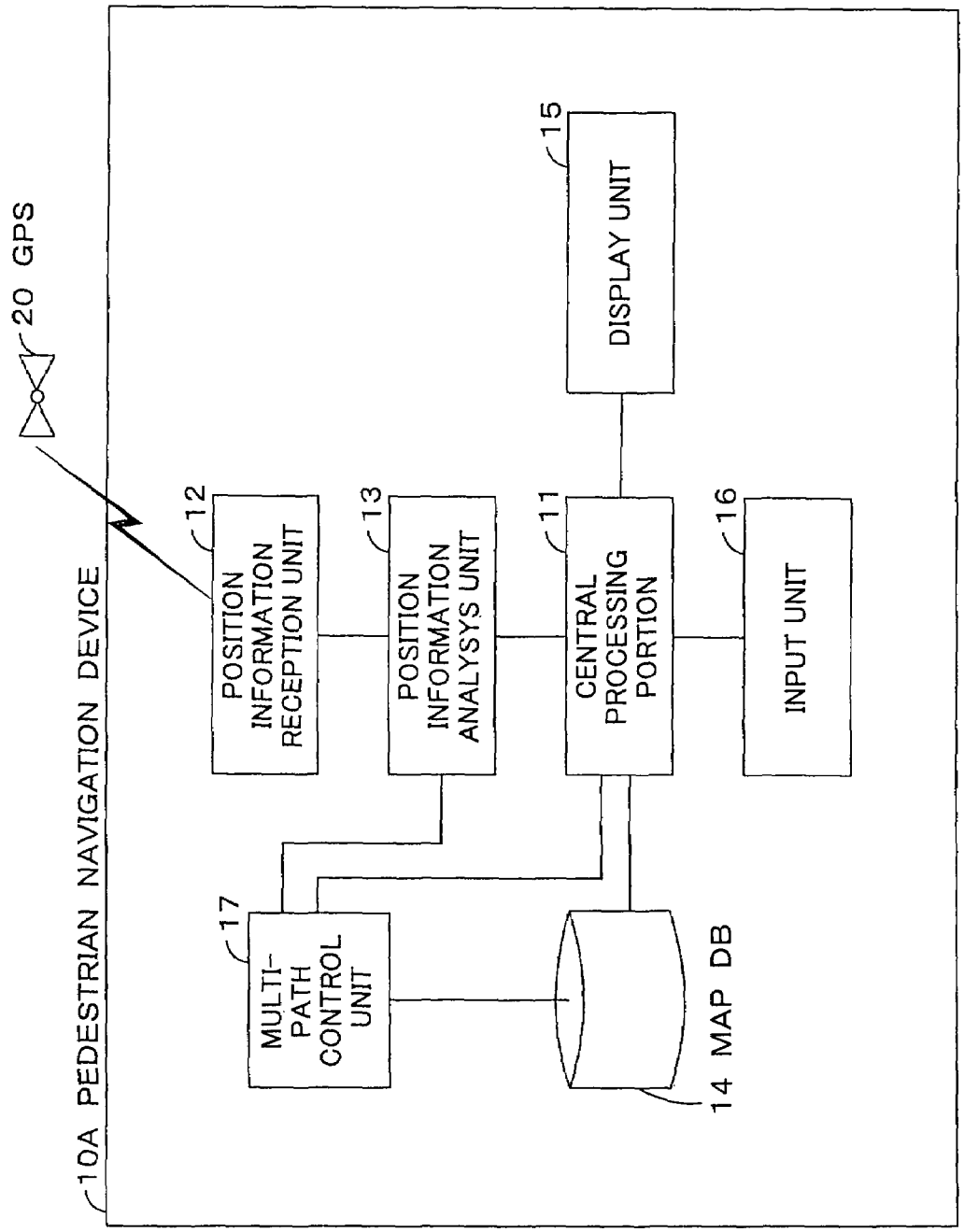
FIG. 1 shows one example of a pedestrian navigation device of this invention.

Below, aspects of a pedestrian navigation device, method, and program of this invention are explained, referring to the drawings.

Of course the scope of this invention is not limited to these aspects.

FIG. 1 shows one example of a pedestrian navigation device. In FIG. 1, the pedestrian navigation device 10A has a position information reception unit 12, which obtains current position information from the GPS (Global Positioning System) 20; a position information analysis unit 13, which calculates the current position by analyzing the current position information received by the position information reception unit 12; a MAPDB (MAP Data Base) 14, which stores map information; a multi-path control unit 17, which specifies a multi-path control distance to control multi-path interference; a central processing portion 11, which calculates current position display information, based on the current position calculated by the position information analysis unit 13, on map information stored in the MAPDB 14, and on the multi-path control distance specified by the multi-path control unit 17; a display unit 15, which displays the current position display information calculated by the central processing portion 11; and, a input unit 16, which inputs route search conditions and the distance specification value to specify the multi-path control distance, and issues instructions to begin navigation.

Here, the multi-path control unit 17 specifies the multi-path control distance in accordance with input of the distance specification value from the input unit 16, or specify the multi-path control distance, based on the current position calculated by the position information analysis unit 13, and on the mesh data of map information stored in the MAPDB 14.

Moreover, if the distance specification value is input from the input unit 16, the multi-path control unit 17 specifies the multi-path control distance according to the distance specification value, but if the distance specification value is not input from the input unit 16, the multi-path control unit 17 specifies the multi-path control distance, based on the current position calculated by the position information analysis unit, and on mesh data of map information stored in the MAPDB 14.

Figure 2:
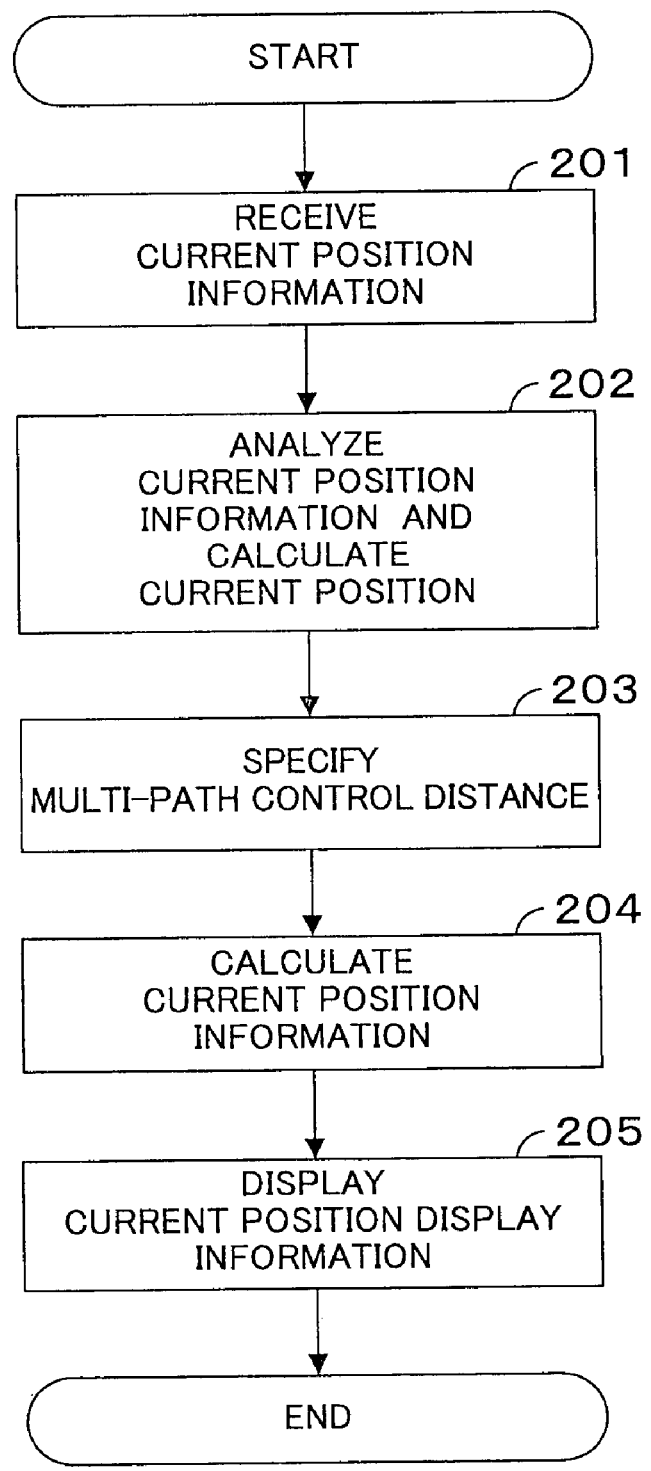
FIG. 2 shows a flowchart showing a pedestrian navigation method of this invention.

FIG. 2 shows a flowchart showing a pedestrian navigation method by a pedestrian navigation device of this invention shown in FIG. 1. In FIG. 1 and FIG. 2, the navigation starts in accordance with input of the route search conditions and an instruction to begin navigation from the input unit 16.

The position information reception unit 12 receives current position information during navigation from the GPS (step 201), and this current position information is analyzed and calculated by the position information analysis unit 13 and sent to the central processing portion 11 and the multi-path control unit 17 (step 202).

Then multi-path control unit 17 specifies multi-path control distance to control multi-path interference (step 203). For example, in a city where there are many buildings and other obstacles causing multi-path, multi-path control distance can be set to 10 meters, and in an area where buildings and other obstacles are not many, can be set to 5 meters.

In step 203, multi-path control unit 17 specifies the multi-path control distance in accordance with input of the distance specification value (for example 5 meters or 10 meters) from the input unit 16 to specify the multi-path control distance, otherwise, specifies the multi-path control distance based on the current position calculated by the position information analysis unit 13 and mesh data of map information prepared beforehand in the MAPDB 14. Moreover, if the distance specification value is input from the input unit 16, the multi-path control unit 17 specifies the multi-path control distance according to the distance specification value, but if distance specification value is not input from the input unit 16, the multi-path control unit 17 specifies the multi-path control distance, based on the current position calculated by the position information analysis unit 13, and on mesh data of map information prepared beforehand in the MAPDB 14.

The central processing portion 11 calculates current position display information based on the current position calculated by the position information analysis unit 13, on map information prepared beforehand in the MAPDB 14, and on multi-path control distance specified by multi-path control unit 17 (step 204). Hence, the travel distance is calculated using the current position calculated by the position information analysis unit 13 and map information prepared beforehand (stored) in the MAPDB 14. When the calculated travel distance is out of the range of the multi-path control distance specified by the multi-path control unit 17, multi-path interference is assumed and current position display information is not going to be calculated.

Display unit 15 displays current position display information calculated by the central processing portion 11 (step 205).

Figure 3:
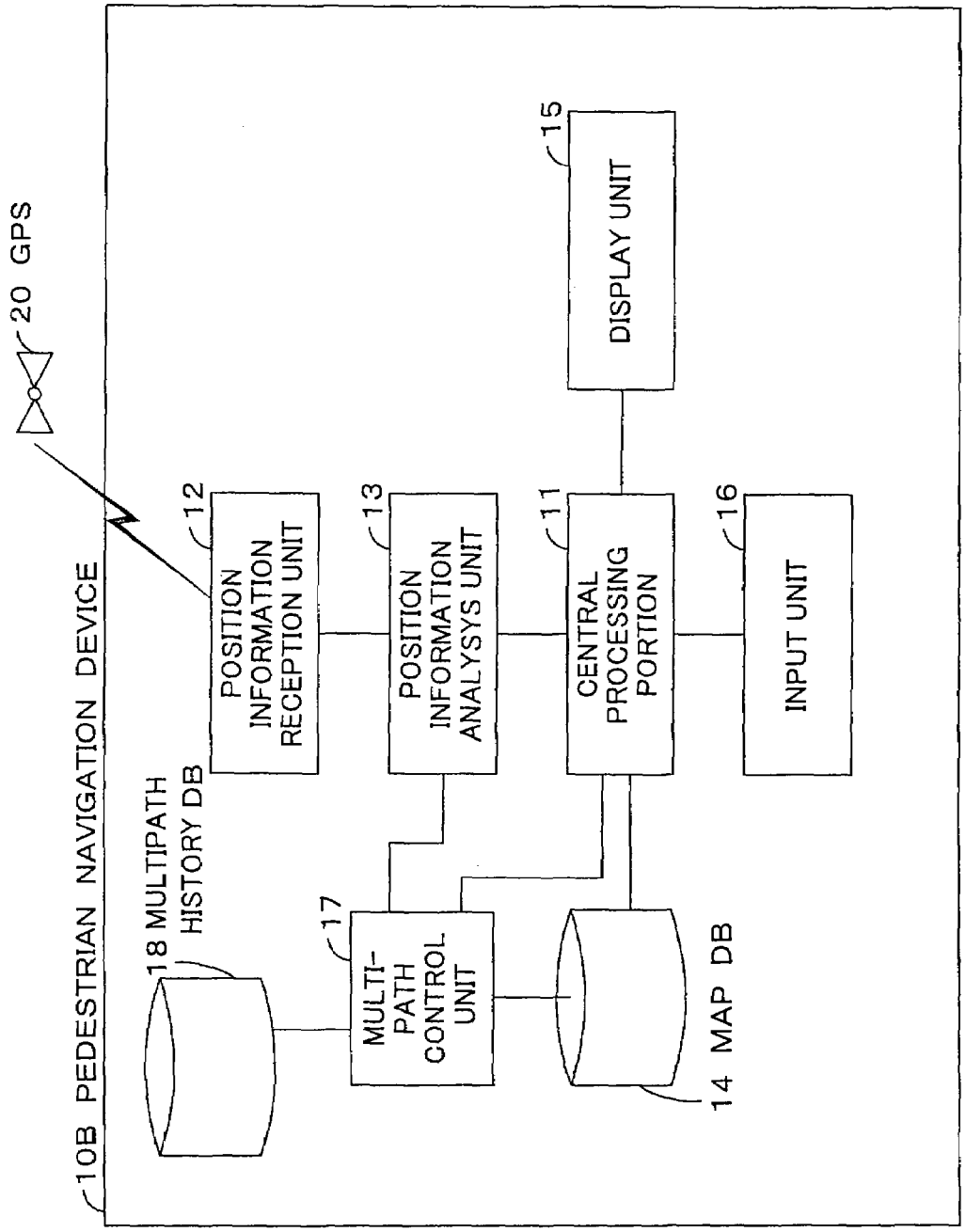
FIG. 3 shows one example of a pedestrian navigation device of this invention.

FIG. 3 shows one example of a pedestrian navigation device of this invention. In FIG. 3, this pedestrian navigation device 10B has a position information reception unit 12, which obtains current position information from a GPS 20; a position information analysis unit 13, which calculates current position by analyzing the current position information received by the position information reception unit 12; a MAPDB 14, which stores map information; a multi-path control unit 17, which specifies a multi-path control distance to control multi-path interference; a central processing portion 11, which calculates current position display information, based on the current position calculated by the position information analysis unit 13, on map information stored in the MAPDB 14, and on the multi-path control distance specified by the multi-path control unit 17; a display unit 15, which displays current position display information calculated by the central processing portion 11; a input unit 16, which inputs a distance specification value to specify multi-path control distance, inputs route search conditions, and issues instructions to start navigation; and a multi-path history DB 18, which stores multi-path history information relating past multi-path control distance specified by the multi-path control unit 17 and map information.

Here, multi-path control unit 17 specifies the multi-path control distance, based on the current position calculated by the position information analysis unit 13, on map information stored in the MAPDB 14, and on multi-path history information stored in the multi-path history DB.

Also, the multi-path control unit 17 searches multi-path history information stored in the multi-path history DB 18, based on the current position calculated by the position information analysis unit 13 and on map information stored in the MAPDB 14, and if multi-path history information is stored in the multi-path history DB 18, specifies the multi-path control distance according to the multi-path history information, but if multi-path history information is not stored in the multi-path history DB 18, specifies multi-path control distance based on the current position calculated by the position information analysis unit 13, and on mesh data of the map information stored in the MAPDB 14.

Moreover, if the distance specification value is input from the input unit 16, multi-path control unit 17 specifies the multi-path control distance according to the distance specification value, but if the distance specification value is not input from the input unit 16, multi-path control unit 17 searches multi-path history information stored in the multi-path history DB 18, based on the current position calculated by the position information analysis unit 13, and on map information stored in the MAPDB 14, and if multi-path history information is stored in the multi-path history DB 18, multi-path control distance is specified based on multi-path history information, but if multi-path history information is not stored in the multi-path history DB 18, the multi-path control distance is specified, based on the current position calculated by the position information analysis unit 13, and on mesh data of map information stored in the MAPDB 14.

Figure 4:
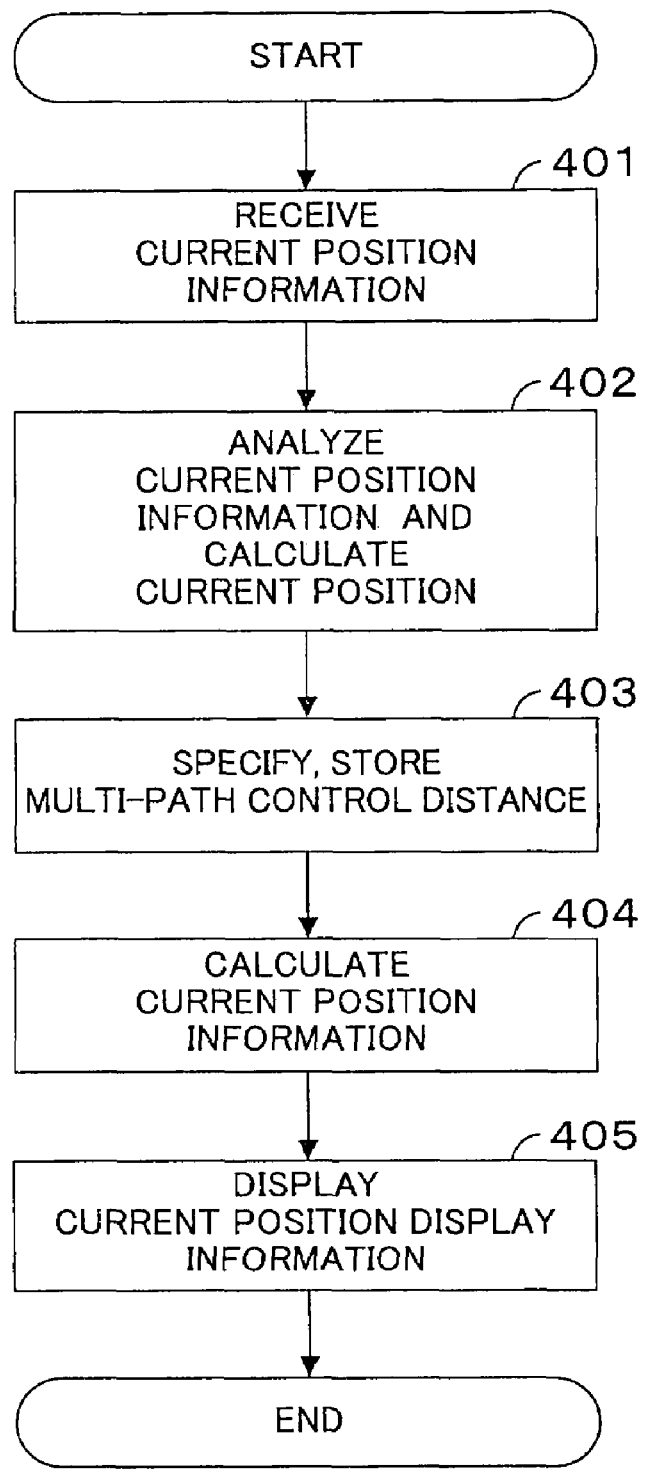
FIG. 4 shows a flowchart showing a pedestrian navigation method of this invention.

FIG. 4 shows a flowchart of a pedestrian navigation method by a pedestrian navigation device of this invention shown in FIG. 3. In FIG. 3 and FIG. 4, the navigation starts in accordance with the input of the route search conditions and an instruction to begin navigation from the input unit 16.

Position information reception unit 12 receives current position information from the GPS (step 401). Then, the current position is calculated by analyzing this current position information by the position information analysis unit 13 and is sent to the central processing portion 11 and the multi-path control unit 17 (step 402).

Next, multi-path control unit 17 specifies multi-path control distance to control multi-path interference. Map information and the multi-path control distance are related to be stored as multi-path history information in the multi-path history DB 18 (step 403). The multi-path control distance is, for example in city area where there are many buildings and other obstacles causing multi-path, can be set to 10 meters, and in an area where there are not many buildings and other obstacles, can be set to 5 meters.

Here, in step 403, multi-path control unit 17 specifies multi-path control distance, based on the current position calculated by the position information analysis unit 13, on map information prepared beforehand in the MAPDB 14, and on multi-path history information in the multi-path history DB 18.

Also, in step 403, the multi-path control unit 17 searches multi-path history information stored in the multi-path history DB 18, based on the current position calculated by the position information analysis unit 13, and on map information prepared beforehand in MAPDB the 14, and if multi-path history information is stored in the multi-path history DB 18, specifies the multi-path-control distance based on multi-path history information, but if multi-path history information is not stored in the multi-path history DB 18, specifies the multi-path control distance, based on the current position calculated by the position information analysis unit 13, and on mesh data of map information prepared beforehand in the MAPDB 14, in addition map information and the multi-path control distance are related to be stored as multi-path history information in the multi-path history DB 18.

Otherwise, in step 403, by the multi-path control unit 17, if the distance specification value is input from the input unit 16, the multi-path control distance is specified according to the distance specification value, and map information and the multi-path control distance are related to be stored as multi-path history information in the multi-path history DB 18, but, if the distance specification value is not input from the input unit 16, multi-path history information stored in the multi-path history DB 18 is searched, based on the current position calculated by the position information analysis unit 13, and on map information stored in the MAPDB 14. Then, if multi-path history information is stored in the multi-path history DB 18, the multi-path control distance is specified based on multi-path history information, but if multi-path history information is not stored in the multi-path history DB 18, the multi-path control distance is specified, based on the current position calculated by the position information analysis unit 13, and on mesh data of map information prepared beforehand in the MAPDB 14, and map information and the multi-path control distance are related to be stored as multi-path history information in the multi-path history DB 18.

The central processing portion 11 calculates current position display information, based on the current position calculated by the position information analysis unit 13, on the map information prepared beforehand in the MAPDB 14, and on multi-path control distance specified by the multi-path control unit 17 (step 404).

Hence, the travel distance is measured based on the current position calculated by the position information analysis unit 13, and on map information prepared beforehand in the MAPDB 14. When the calculated travel distance is out of the range of the multi-path control distance specified by the multi-path control unit 17, multi-path interference is assumed and current position display information is not going to be calculated.

The display unit 15 displays present position information calculated by the central processing portion 11 (step 405).

In the above, a pedestrian navigation device and pedestrian navigation method of this invention have been explained. A portable telephone or other portable terminal can be provided with a program for navigation of pedestrian routes, and such a program can realize the functions of the above-described pedestrian navigation device and method in a portable terminal.

As explained above, through a pedestrian navigation device, method, and program of this invention, by specifying multi-path control distance, multi-path interference can be appropriately corrected, enabling to accurately navigate the routes of a pedestrian.

The invention claimed is:

1. A pedestrian navigation device for navigating the route of a pedestrian, comprising:

position information reception means for obtaining current position information;

position information analysis means for calculating a current position by analyzing said current position information received by said position information reception means;

map information storage means for storing map information;

multi-path control means for specifying a multi-path control distance to control multi-path interference;

central processing means for calculating current position display information, based on said current position calculated by said position information analysis means, on said map information stored by said map information storage means, and on said multi-path control distance specified by said multi-path control means;

display means for displaying said current position display information calculated by said central processing means; and, input means for inputting a distance specification value to specify said multi-path control distance; and characterized in that said multi-path control means specifies said multi-path control distance according to said distance specification value input by said input means.

2. The pedestrian navigation device according to claim 1, characterized in that by said multi-path control means,
(a) if distance specification value is input by said input means, said multi-path control distance is specified according to said distance specification value; but
(b) if distance specification value is not input by said input means, said multi-path control distance is specified, based on said current position calculated by said position information analysis means, and on mesh data of said map information stored by said map information storage means.

3. The pedestrian navigation device according to claim 2, characterized in that said position information reception means obtains current position information from a GPS(Global Positioning System).

4. The pedestrian navigation device according to claim 1, characterized in that said position information reception means obtains current position information from a GPS(Global Positioning System).

5. A pedestrian navigation device for navigating the route of a pedestrian, comprising:
position information reception means for obtaining current position information;
position information analysis means for calculating current position by analyzing said current position information received by said position information reception means;
map information storage means for storing map information;
multi-path control means for specifying multi-path control distance to control multi-path interference;
multi-path history storage means for storing multi-path history information relating past multi-path control distance and map information;
central processing means for calculating current position display information, based on said current position calculated by said position information analysis means, on said map information stored by said map information storage means, and on said multi-path control distance specified by said multi-path control means;
display means for displaying said current position display information calculated by said central processing means; and,
input means for inputting a distance specification value to specify said multi-path control distance; and characterized in that by said multi-path control means,
(a) if the distance specification value is input by said input means, said multi-path control distance is specified according to said distance specification value; but
(b) if the distance specification value is not input by said input means, said multi-path history information stored by said multi-path history storage means is searched, based on said current position calculated by said position information analysis means, and on said map information stored by said map information storage means; and
(b-1) if said multi-path history information is stored by said multi-path history storage means, said multi-path control distance is specified based on said multi-path history information; but
(b-2) if said multi-path history information is not stored by said multi-path history storage means, said multi-path control distance is specified, based on said current position calculated by said position information analysis means, and on mesh data of said map information stored by said map information storage means.

6. The pedestrian navigation device according to claim 5, characterized in that said position information reception means obtains current position information from a GPS(Global Positioning System).

7. A pedestrian navigation method for navigating the route of a pedestrian, comprising the steps of:
(A) obtaining current position information;
(B) calculating a current position by analyzing said obtained current position information;
(C) regarding a multi-path control distance to control multi-path interference,
(C-1) if the distance specification value is input, specifying a multi-path control distance according to said distance specification value$_{13}$ G but
(C-2) if the distance specification value is not input, specifying a multi-path control distance, based on said calculated current position, and on mesh data of said map information prepared beforehand; and
(D) calculating current position display information, based on said calculated current position, on map information prepared beforehand, and on said specified multi-path control distance; and
(E) displaying said calculated current position display information.

8. A computer readable medium having computer program logic recorded thereon for allowing a portable terminal to navigate a pedestrian route wherein the computer program logic is executable by a processor in the portable terminal to perform the method according to claim 7.

9. A pedestrian navigation method for navigating the route of a pedestrian, comprising the steps of:
(A) obtaining current position information;
(B) calculating a current position by analyzing said obtained current position information;
(C) when specifying a multi-path control distance to control multi-path interference and in addition relating map information and the multi-path control distance to store as multi-path history information,
(C-1) if the distance specification value is input, said multi-path control distance is specified according to said distance specification value, and in addition map information and the multi-path control distance are related to be stored as multi-path history information; but
(C-2) if the distance specification value is not input, multi-path history information is searched, based on said calculated current position, and on said map information prepared beforehand; and
(C-2-1) if said multi-path history information is stored, said multi-path control distance is specified based on said multi-path history information; but
(C-2-2) if said multi-path history information is not stored, said multi-path control distance is specified, based on said calculated current position, and on mesh data of said map information prepared beforehand, and in addition map information and the multi-path control distance are related to be stored as multi-path history information;

(D) calculating current position display information, based on said calculated current position, on map information prepared beforehand, and on said specified multi-path control distance; and (E) displaying said current position display information.

10. The pedestrian navigation method according to claim 9, characterized in that in said step (A), current position information is obtained from the GPS.

11. A computer readable medium having computer program logic recorded thereon for allowing a portable terminal to navigate a pedestrian route wherein the computer program logic is executable by a processor in the portable terminal to perform the method according to claim 10.

12. A computer readable medium having computer program logic recorded thereon for allowing a portable terminal to navigate a pedestrian route wherein the computer program logic is executable by a processor in the portable terminal to perform the method according to claim 9.

* * * * *